United States Patent
Kamp et al.

(10) Patent No.: US 9,958,071 B1
(45) Date of Patent: May 1, 2018

(54) HIGH TEMPERATURE SHAFT SEAL FOR BLEED VALVE WITH ROLLER BEARINGS

(71) Applicant: Hamilton Sundstrand Corporation, Windsor Locks, CT (US)

(72) Inventors: Josh Kamp, Glastonbury, CT (US); Donald E. Army, Enfield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days. days.

(21) Appl. No.: 15/433,228

(22) Filed: Feb. 15, 2017

(51) Int. Cl.
*F16K 1/226* (2006.01)
*F16K 41/02* (2006.01)

(52) U.S. Cl.
CPC .......... *F16K 1/2268* (2013.01); *F16K 41/026* (2013.01)

(58) Field of Classification Search
CPC ...... F16K 1/2268; F16K 41/02; F16K 41/023; F16K 41/026
USPC .......................................... 251/214, 305–308
See application file for complete search history.

(56) References Cited

U.S. PATENT DOCUMENTS

| | | | | |
|---|---|---|---|---|
| 2,876,987 A * | 3/1959 | Renfro | .................. | F16K 41/046 251/214 |
| 2,966,169 A * | 12/1960 | Reece | ....................... | F16K 1/16 251/214 |
| 3,991,974 A * | 11/1976 | Bonafous | .............. | F16K 1/2265 251/306 |
| 4,022,424 A | 5/1977 | Davis et al. | | |
| 4,270,730 A * | 6/1981 | Hinrichs | ................... | F16K 1/22 251/214 |
| 4,759,530 A * | 7/1988 | Iff | ......................... | F16K 1/2265 251/306 |
| 6,022,000 A * | 2/2000 | Laulhe | ................. | F16K 1/2268 251/306 |
| 7,240,691 B2 | 7/2007 | Bevan | | |
| 8,157,241 B2 | 4/2012 | Swinford | | |
| 8,172,202 B2 | 5/2012 | Mendoza et al. | | |
| 2013/0279839 A1* | 10/2013 | Ohba | ................. | F16C 33/7856 384/482 |
| 2016/0333795 A1 | 11/2016 | Polluck et al. | | |

FOREIGN PATENT DOCUMENTS

EP 2136114 A1 12/2009

* cited by examiner

*Primary Examiner* — John Bastianelli
(74) *Attorney, Agent, or Firm* — Kinney & Lange, P.A.

(57) ABSTRACT

A seal assembly for a creating a seal between a shaft and a valve housing of a bleed valve that impedes contaminants from reaching bearings includes first and second seal pieces. The first seal piece circumferentially surrounds the shaft and is disposed between the shaft and the valve housing. The second seal piece is in contact with and is disposed axially adjacent to the first seal piece relative to the shaft. The second seal piece is biased against the first seal piece.

9 Claims, 4 Drawing Sheets

HIGH TEMPERATURE SHAFT SEAL FOR BLEED VALVE WITH ROLLER BEARINGS

BACKGROUND

The present disclosure is directed generally to bleed valves, and more specifically, to a shaft seal assembly for butterfly bleed valves.

Butterfly valves include a valve element (e.g., disc) mounted onto a rotatable shaft extending through a flow path through the valve. When the valve element occupies a closed position, contaminants (e.g., dust, sand particles, foreign objects, etc.) can build-up and fall into a bearing compartment at an end of the rotatable shaft. Operation of bearings (e.g., roller bearings and/or ball bearings) in the bearing compartment can be impaired and/or damaged by these contaminants which can degrade performance of the bearings and possibly result in eventual failure of the butterfly valve.

SUMMARY

A seal assembly for a creating a seal between a shaft and a valve housing of a bleed valve that impedes contaminants from reaching bearings includes first and second seal pieces. The first seal piece circumferentially surrounds the shaft and is disposed between the shaft and the valve housing. The second seal piece is in contact with and is disposed axially adjacent to the first seal piece relative to the shaft. The second seal piece is biased against the first seal piece.

A bleed valve includes a valve housing with a main flow passage and a bore, a shaft, a flow control member, a bearing housing with a bearing compartment, a bearing assembly, and a seal assembly. The shaft includes first and second ends, extends across the main flow passage, and is rotatable about an axis. The flow control member is mounted to the shaft and is configured to regulate a flow of a fluid through the main flow passage. The bearing housing is connected to the valve housing. The first end of the shaft extends through the bore of the valve housing into the bearing compartment. The bearing assembly is disposed in the bearing compartment. The seal assembly is disposed between the valve housing and the shaft and includes first and second seal pieces. The first seal piece circumferentially surrounds the shaft and is disposed between the shaft and the valve housing such that an axial length of the first seal piece relative to the shaft is greater than an axial length of the bore of the valve housing relative to the shaft. The second seal piece is in contact with and is disposed axially adjacent to the first seal piece relative to the shaft such that the second seal piece is axially biased against the first seal piece relative to the shaft.

DETAILED DESCRIPTION

The disclosed shaft seal is a two-piece seal mounted between a valve housing and a rotatable shaft of a bleed valve that reduces the amount of contamination entering a bearing cavity in the bleed valve. A first seal piece forms a wall between the shaft and the valve housing that contaminants must first climb over. The second seal piece is loaded axially against the first seal piece and creates a very small clearance with the shaft to limit the amount of contamination entering the bearing cavity. Both pieces are made from high temperature material capable of withstanding a high temperature environment of the bleed valve, which regulates a flow of bleed air from a compressor section of a gas turbine engine reaching up to 1,500° F.

Figure 1:
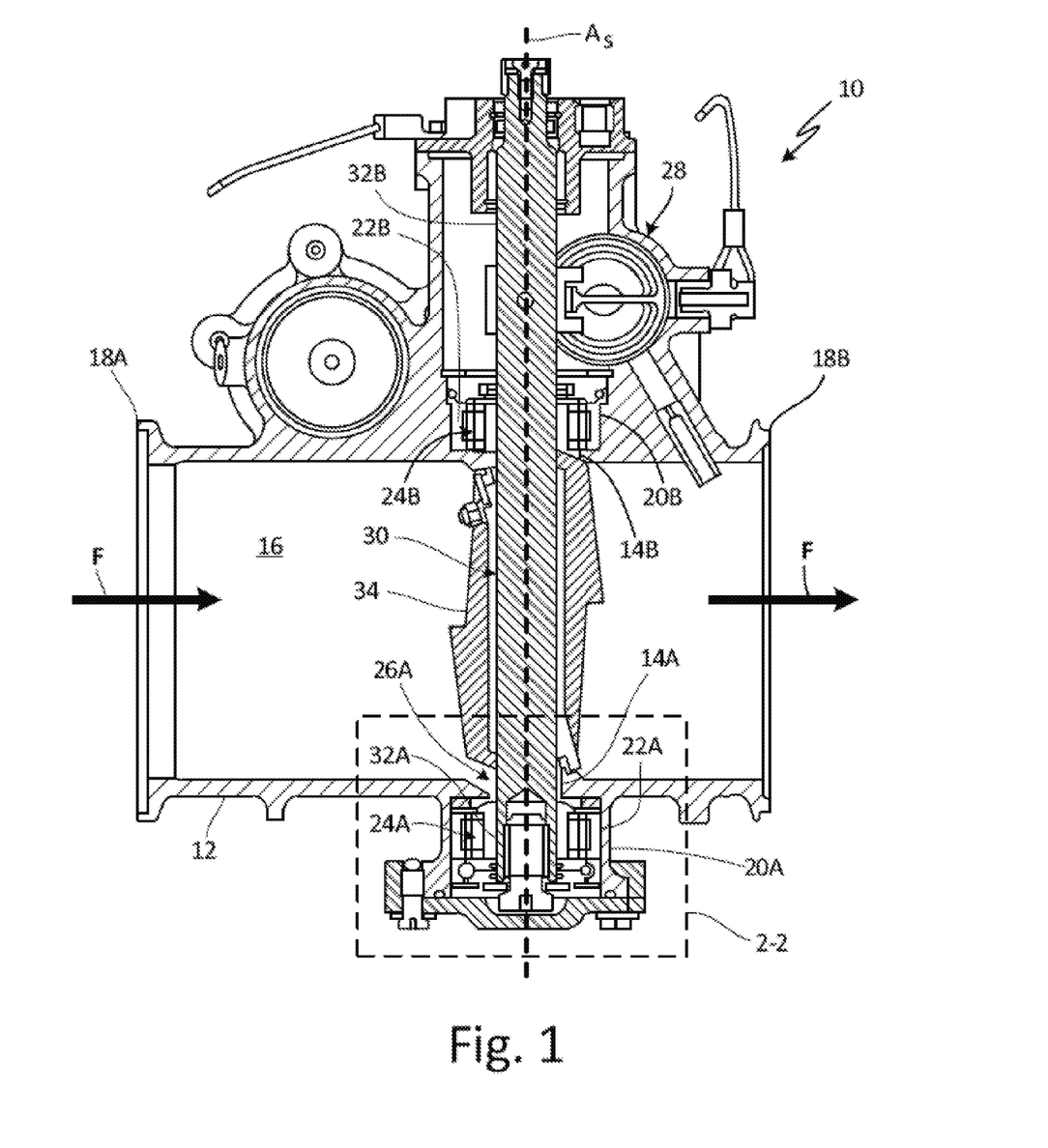
FIG. 1 is a cross-section view of a bleed valve in a closed position.

FIG. 1 shows a cross-section view of bleed valve 10. Bleed valve 10 generally includes valve housing 12 (with first bore 14A and main flow passage 16 including upstream side 18A and downstream side 18B), first bearing housing 20A (with first bearing compartment 22A, first bearing assembly 24A, and first seal assembly 26A), second bearing housing 20B (with second bearing compartment 22B and second bearing assembly 24B), actuator assembly 28, shaft 30 (with first end 32A, second end 32B, and axis $A_S$), and flow control member 34. Flow F enters bleed valve 10 through upstream side 18A of main flow passage 16 and exits through downstream side 18B.

Bleed valve 10 is a valve for controlling a flow of fluid such as flow F. In one non-limiting embodiment, bleed valve 10 can include a butterfly valve with a single (e.g., flow control member 34) or plurality of flow control elements. Valve housing 12 is a generally cylindrical piece of solid material with main flow passage 16 passing through valve housing 12. Valve housing 12 can have at least one wall defining main flow passage 16, such as a cylindrical wall. First bore 14A is a hole or channel in a bottom of valve housing 12 (bottom relative to orientation shown in FIG. 1).

Main flow passage 16 is a channel or conduit configured to allow a fluid to pass through bleed valve 10. Upstream side 18A and downstream side 18B are upstream and downstream ends of valve housing 12, respectively. Note that "upstream" and "downstream" are described with reference to an intended flow direction through main flow passage 16. In this configuration, designed to regulate flow in a single direction, the description of "upstream" and "downstream" are not intended to encompass transient, emergency, or other unplanned events whereby reversals of flow occur, temporarily resulting in the "upstream" side having "downstream" flow, or vice versa. It will be recognized that other configurations of bleed valve 10 may be configured to regulate flow in both directions.

First and second bearing housings 20A and 20B are casings of solid material. First and second bearing compartments 22A and 22B are chambers within first and second bearing housings 20A and 20B, respectively. First and second bearing assemblies 24A are assemblies of one or more bearings such as ball bearings, roller bearing, or other types of bearings. First seal assembly 26A is an assembly of seals. In one non-limiting embodiment, first seal assembly 26A can include a high temperature resistant two-piece configuration for creating a seal between valve housing 12 and shaft 30 (see FIGS. 2-4).

Actuator assembly 28 is an assembly configured to rotate shaft 30. In one non-limiting embodiment, actuator assembly 28 can be a pneumatically actuated assembly with a means for translating axial motion of a piston into rotary motion of shaft 30 so as to rotate flow control member 34 from an open to a closed position within main flow passage 16.

Shaft 30 is an elongated piece of material and generally includes a cylindrical configuration. First end 32A and second end 32B are first and second ends of shaft 30. First end 32A is on a bottom end of shaft 30 and second end 32B is on a top end of shaft 30 (top and bottom relative to orientation shown in FIG. 1). Flow control member 34 is a disc, such as a butterfly disc, or other structure configured to regulate flow F of a fluid past flow control member 34. Axis $A_S$ is an axis of rotation of shaft 30. Flow F is a fluid passing through main fluid passage 16.

In one non-limiting embodiment, bleed valve 10 is connected to a bleed assembly of a gas turbine engine (not shown) or other arrangement whereby a portion of a compressed fluid, such as air, is tapped from a working fluid path and used for other purposes. In another non-limiting embodiment of a gas turbine engine, air can be bled from a compressor for thermal management, environmental control systems, air generation units, engine starting, or other myriad uses.

Valve housing 12 can be fluidly connected at upstream side 18A to a bleed duct of a gas turbine engine compressor. First bore 14A passes through the bottom valve housing 12 and fluidly connects main flow passage 16 to first bearing compartment 22A. Second bore 14B passes through the top valve housing 12 and fluidly connects main flow passage 16 to second bearing compartment 22B. First and second bores 14A and 14B are on opposite upper and lower sides of valve housing 12. First and second bores 14A and 14B are coaxially aligned about rotational axis $A_S$ of shaft 30. Main flow passage 16 passes through valve housing 12 and extends from first side 18A (upstream/left side as shown in FIG. 1) to second side 18B (downstream/right side as shown in FIG. 1). In one non-limiting embodiment, second side 18B can be fluidly connected to an anti-icing system of a gas turbine engine.

First and second bearing housings 20A and 20B are physically connected to valve housing 12. First bearing compartment 22A is contained within and/or enclosed by first bearing housing 20A. Second bearing compartment 22B is contained within and/or enclosed by second bearing housing 20B. First and second bearing compartments 22A and 22B are fluidly connected to main flow passage 16 via first and second bores 14A and 14B, respectively. First bearing assembly 24A is disposed in first bearing compartment 22A of first bearing housing 20A and second bearing assembly 24B is disposed in second bearing compartment 22B of second bearing housing 20B. First seal assembly 26A is disposed between valve housing 12 and shaft 30.

Actuator assembly 28 is operably connected to shaft 30. In one non-limiting embodiment, actuator assembly 28 can be disposed in an actuator chamber defined by one or more walls retaining actuator components. Shaft 30 extends across main flow passage 16 and is rotatable about axis $A_S$. First end 32A of shaft 30 extends through first bore 14A of valve housing 12 and into first bearing compartment 22A.

Flow control member 34 is mounted to shaft 30 for operable connection with actuator assembly 28. Flow control member 34 is disposed in main flow passage 16 between upstream side 18A and downstream side 18B and generally separates upstream side 18A from downstream side 18B of main flow passage 16.

Axis $A_S$ passes through a center of shaft 30. Flow F enters upstream side 18A of valve housing 12, passes through main flow passage 16, across flow control member 34, and to second side 18B of valve housing 12.

Bleed valve 10 can be actuated in response to a pressure input as compared to a desired pressure set point. The pressure input can be from a sensor (not shown) or other suitable flow location in or away from bleed valve 10. In this and other installations, bleed valve 10 is intended to control fluid flow in a single direction. In one non-limiting embodiment, the compressed working fluid is expected to enter main flow passage 16 on upstream side 18A, represented by flow F. When permitted by opening of bleed valve 10, the working fluid exits main flow passage 16 through downstream side 18B.

Actuator assembly 28 drives rotational movement of flow control member 34 by rotatably driving shaft 30 to position flow control member 34. In one non-limiting embodiment, in order to drive rotation of shaft 30 (and flow control member 34), actuator assembly 28 can include at least one actuator unit (e.g., one or more linear actuator units) adapted to effect rotation of flow control member 34 via second end 32B of shaft 30. For example, as a piston of a linear actuator unit is pumped from a first position to a second position, the linear actuation of the piston drives rotational actuation of shaft 30. The linear actuation of the piston is used to control the rotational actuation of shaft 30 which in turn controls rotation of shaft 30. Actuator assembly 28 can also include a scotch yoke configuration with a pin that slides along a slot to effect translation of linear motion from one body into rotational motion of another body (or vice versa).

Flow control member 34 can be adapted to rotate via rotation of shaft 30 and to regulate a flow of a fluid through main flow passage 16. In the non-limiting embodiment shown in FIG. 1, in which flow control member 34 is a disc, flow control member 34 can be rotatable in main flow passage 16 between a fully closed position and a fully open position. The fully closed position, shown in FIG. 1, can be defined by a leading edge and a trailing edge of flow control member 34 abutting the one or more walls defining main flow passage 16. Though shown in a closed position, rotational position of flow control member 34 results in an opening for fluid to pass through main fluid passage 16. In one non-limiting embodiment, the rotational position of flow control member 34 defines the size of a fluid opening about the perimeter of flow control member 34. The rotational position and speed of flow control member 34 (via shaft 30) can be calibrated in conjunction with actuator assembly 28 to control an effective size of the flow opening through main flow passage 16.

Additional details of butterfly bleed valves can also be found in co-pending U.S. patent application Ser. No. 14/814,245 filed on Jul. 30, 2015 and U.S. patent application Ser. No. 14/599,898 filed on Jan. 19, 2015, which are herein incorporated by reference in their entirety.

Depending on operating conditions of bleed valve 10, flow F passing through main fluid passage 16 can contain contaminants such as dust, sand particles, and/or foreign objects. When flow control member 34 occupies a closed position, flow F is prevented from passing across flow control member 34. As the fluid that forms flow F comes into contact with flow control member 34, contaminants contained in flow F build-up on an upstream side of flow control member 34 and fall into first bearing compartment 22A at first end 32A of shaft 30. Operation of first bearing assembly 24A in first bearing compartment 22A can become impaired and/or damaged by these contaminants. Performance of first bearing assembly 24A can be degraded and the result can be eventual failure of bleed valve 10. As will be discussed further with respect to FIGS. 2-4, first seal assembly 26A reduces the amount of contaminant entering first bearing compartment 22A by forming a high temperature seal between valve housing 12 and shaft 30.

Figure 2:
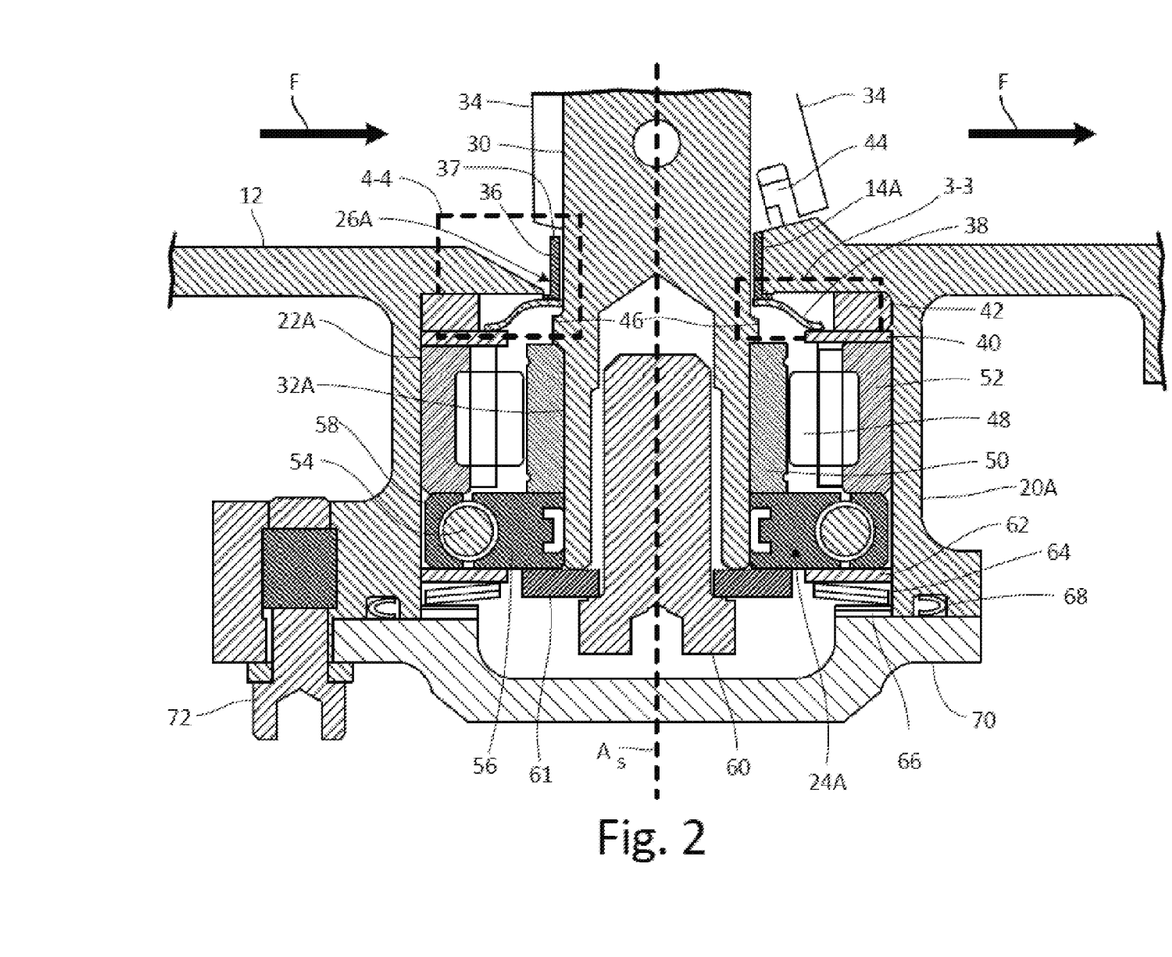
FIG. 2 is an enlarged cross-section view of a bearing compartment of the bleed valve within detail of 2-2 in FIG. 1.

FIG. 2 shows a cross-section view of first bearing housing 20A and first bearing compartment 22A of bleed valve 10 taken along 2-2 in FIG. 1. In addition to the elements discussed in relation to FIG. 1, FIG. 2 shows first seal assembly 26A (with first seal piece 36 and second seal piece 38) in greater detail, as well as shim 40, first spacer 42, seal 44 of flow control member 34, shoulder 46 of shaft 30, roller bearing 48, inner roller bearing race 50, outer roller bearing race 52, ball bearing 54, inner ball bearing race 56, outer ball bearing race 58, first screw 60, washer 61, second spacer 62, resilient elements 64, third spacer 66, gasket 68, cap 70, and second screw 72.

First seal piece 36 is a seal element in the form of a collar, ring, or bushing. Second seal piece 38 is a seal element in the form of a solid disc with an S-shaped curved cross-section. In one non-limiting embodiment, materials of first seal piece 36 and second seal piece 38 can include high temperature material capable of withstanding temperatures of 800° F. or more such as for example 1,400° F. to 1,500° F. In another non-limiting embodiment, the material of first seal piece 36 and second seal piece 38 can include an austenitic nickel-chromium-based superalloy or another type nickel or cobalt based alloy.

Shim 40 is a thin piece of solid material in the shape of a ring. First spacer 42 is a ring of solid material. Seal 44 is a sealing element of flow control member 34. Shoulder 46 is a portion of shaft 30 where a diameter of shaft 30 extends in a radially outward direction relative to shaft 30.

Roller bearing 48 is a cylindrical bearing element. In one non-limiting embodiments, roller bearing 48 can include a plurality of cylindrical bearing elements. Inner roller bearing race 50 is a radially inward containment element for supporting roller bearing 48. Outer roller bearing race 52 is a radially outward containment element for supporting roller bearing 48.

Ball bearing 54 is a ball bearing element. Inner ball bearing race 56 is a radially inward containment element for supporting ball bearing 54. Outer ball bearing race 58 is a radially outward containment element for supporting ball bearing 54.

First screw 60 is a threaded fastener. Washer 61 is a flat ring of solid material. Second spacer 62 is a ring of solid material. Resilient elements 64 are spring-loaded discs. In one non-limiting embodiment, resilient elements 64 can include at least one Bellville washer. Third spacer 66 is a ring of solid material. Gasket 68 is a ring of solid sealing material. Cap 70 is a cover for first bearing housing 20A. Second screw 72 is a threaded fastener.

First seal piece 36 is a ring with an L-shaped cross-section that circumferentially surrounds shaft 30 and is disposed between shaft 30 and valve housing 12. Second seal piece 38 is in contact with and disposed axially adjacent to first seal piece 36 relative to shaft 30. The S-shape of second seal piece 38 provides for resilient axial deflection of second seal piece 38 by enabling axial compression and expansion of second seal piece 38. The resilient axial deflection of second seal piece 38 causes second seal piece 38 to be axially biased against shim 40 and against first seal piece 36. The resilient axial deflection of second seal piece 38 accounts for tolerance stack up of first seal assembly 26A by maintaining contact with shim 40 and first seal piece 36 during operation of bleed valve 10. Shim 40 is disposed between first spacer 42 and outer roller bearing race 52. Shim 40 is in contact with and disposed axially adjacent to second seal piece 38. First spacer 42 is disposed between shim 40 and valve housing 12.

Seal 44 is embedded in flow control member 34 and comes into contact with valve housing 12. Shoulder 46 is formed as a part of shaft 30 and is disposed on a portion of shaft 30 that extends into first bearing compartment 22A (e.g., first end 32A shown in FIG. 1). Roller bearing 48 is slidably engaged with inner roller bearing race 50 and outer roller bearing race 52. Inner roller bearing race 50 abuts inner ball bearing race 56 and outer roller bearing race 52 abuts outer ball bearing race 58. Ball bearing 54 is slidably engaged with inner ball bearing race 56 and outer ball bearing race 58.

First screw 60 is inserted through washer 61 and is threadably engaged with shaft 30. Washer 61 is disposed between a head of first screw 60 and shaft 30. Washer 61 compresses first bearing assembly 24A, shim 40, and first spacer 42 against valve housing 12. Second spacer 62 is disposed between outer ball bearing race 58 and resilient elements 64. Resilient elements 64 are disposed between second spacer 62 and third spacer 66. Third spacer 66 is disposed between resilient elements 64 and cap 70. Cap 70 is attached to first bearing housing 20A via second screw 72 which is threadably engaged with bearing housing 20A and cap 70.

As shaft 30 is rotated to drive flow control member 34 into a closed state, roller bearing 48 and ball bearing 54 provide a dynamic (e.g., rotatable) interface between first end 32A of shaft 30 and first bearing housing 20A. For example, as shaft 30 rotates relative to first bearing housing 20A, a gap (see e.g., discussion of FIG. 3) between shaft 30 and second seal piece 38 enables shaft 30 to also rotate relative to first seal piece 36 and second seal piece 38 of first seal assembly 26A (which remain rotationally fixed relative to first bearing housing 20A). In another non-limiting embodiment, first seal piece 36 and second seal piece 38 of first seal assembly 26A can rotate with shaft 30 or move independently from either shaft 30 or first bearing housing 20A.

When flow control member 34 occupies a closed state, contaminant from flow F impinges onto flow control member 34 and drops down onto valve housing 12. First seal piece 36 forms a seal between shaft 30 and valve housing 12 so as to prevent contaminant from falling past first seal piece 36 and into first bearing compartment 22A. The contaminant is forced to accumulate above a level higher than top edge 37 of first seal piece 36 (an upper edge as shown relative to the orientation in FIG. 2) before the contaminant is able to pass through a gap between first seal piece 36 and shaft 30. Any contaminant that does pass first seal piece 36 is further prevented by second seal piece 38 from infiltrating first bearing assembly 24A by forming a small clearance and therefore tight seal with shaft 30 small enough to prevent most contaminant from passing across a sealing interface between second seal piece 38 and shaft 30 (see FIGS. 3 and 4 for further discussion).

First seal piece 36 and second seal piece 38 function to prevent contaminant from passage into first bearing compartment 22A from main flow passage 16. With preventing contaminant from entering into first bearing assembly 24A, first bearing assembly 24A in first bearing compartment 22A can be kept clean of contaminants, improved performance of first bearing assembly 24A occurs and results in a longer life of bleed valve 10.

Figure 3:
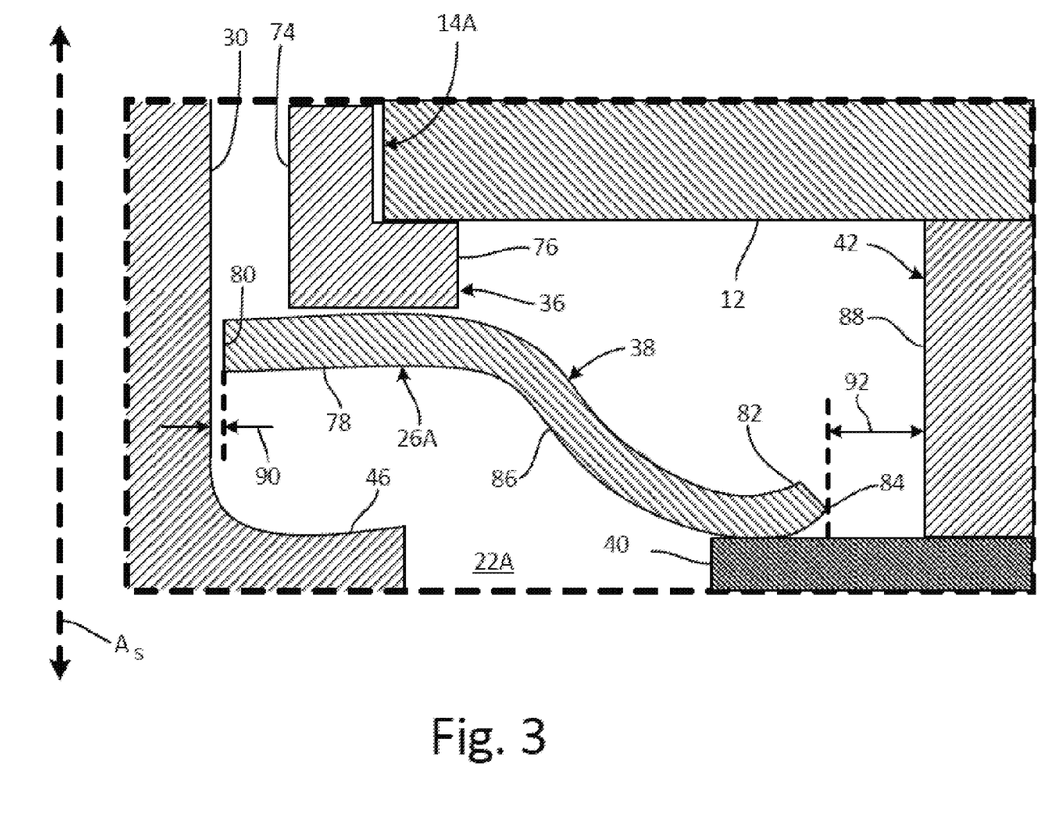
FIG. 3 is an enlarged cross-section view of a first portion of the bearing compartment of the bleed valve within detail of 3-3 in FIG. 2.

FIG. 3 shows a cross-section view of first bearing housing 20A and first bearing compartment 22A of bleed valve 10 taken along 3-3 in FIG. 2. In addition to the elements discussed in relation to FIG. 2, FIG. 3 shows first seal piece 36 (with cylindrical portion 74 and flange 76), second seal piece 38 (with radially inward portion 78, inner edge 80, radially outward portion 82, outer edge 84, and radially intermediate portion 86), first spacer 42 (with radially inward surface 88), inner gap 90, and outer gap 92.

Cylindrical portion 74 of first seal piece 36 is a cylindrical ring of solid material configured to provide a seal between valve housing 12 and shaft 30. Flange 76 of first seal piece 36 is a solid ring of solid material configured to provide a seal between valve housing 12 and second seal piece 38. Radially inward portion 78 is a radially inward end of second seal piece 38. Inner edge 80 is a radially inner-most edge of second seal piece 38. Radially outward portion 82 is a radially outward end of second seal piece 38. Outer edge 84 is a radially outer-most edge of second seal piece 38. Radially intermediate portion 86 is a portion of second seal piece 38 extending between radially inward portion 78 and radially outward portion 82.

Radially inward surface 88 is a radially inner surface of spacer 42. Inner gap 90 is a space between shaft 30 and inner edge 80 of second seal piece 38 extending axially relative to shaft 30. Outer gap 92 is a space between outer edge 84 of second seal piece 38 and radially inward surface 88 of first spacer 42 along a radial direction relative to shaft 30.

Cylindrical portion 74 is shrink fit into first bore 14A of valve housing 12. Cylindrical portion 74 extends axially relative to shaft 30. Flange 76 extends radially from cylindrical portion 74 relative to shaft 30. Radially inward portion 78 of second seal piece 38 is axially biased against flange 76 of first seal piece 36 relative to shaft 30. Inner edge 80 of second seal piece 38 forms inner gap 90 with shaft 30 along the radial direction relative to shaft 30. In one non-limiting embodiment, inner gap 90 includes 0.0005 to 0.0015 inches (0.0127 to 0.0381 millimeters).

Radially outward portion 82 of second seal piece 38 is axially biased against shim 40 relative to shaft 30. Outer edge 84 of second seal piece 38 forms outer gap 92 with radially inward surface 88 of first spacer 42 along the radial direction relative to shaft 30. In one non-limiting embodiment, outer gap 92 includes 0.015 to 0.050 inches (0.381 to 1.270 millimeters). In another non-limiting embodiment, a corner of outer edge 84 closest to shim 40 can curved away from shim 40 so as to prevent a corner of outer edge 84 from digging into or getting caught on shim 40 radially displacement of second seal piece 38. Radially intermediate portion 86 of second seal piece 38 is connected to and extends between radially inward portion 78 and radially outward portion 82 of second seal piece 38.

Upon assembly of bleed valve 10, cap 70 is screwed onto first bearing housing 20A causing compression of the elements in first bearing housing 20A and particularly biasing shim 40 against radially outward portion 82 of second seal piece 38. Because of this, radially inward portion 78 of second seal piece 38 is axially biased against flange 76 of first seal piece 36 which compresses first seal piece against valve housing 12 thereby creating a sealing interface with valve housing 12.

Second seal piece 38 is configured to maintain inner gap 90 of 0.0005 to 0.0015 inches (0.0127 to 0.0381 millimeters) upon flexion, deflection, or radial displacement of shaft 30. Outer gap 92 having a value of 0.015 to 0.050 inches (0.381 to 1.270 millimeters) prevents second seal piece 38 from coming into contact with first spacer 42 if shaft 30 moves radially such as if shaft 30 experiences flexion, deflection, or otherwise radially displaces.

Maintaining inner gap 90 at 0.0005 to 0.0015 inches (0.0127 to 0.0381 millimeters) provides for a sealing interface more capable of preventing the passage of contaminants than existing sealing interfaces for high temperature butterfly bleed valves. Due to this relatively small clearance of inner gap 90, second seal piece 38 remains generally centered with respect to Axis $A_S$ of shaft 30 because the small clearance of inner gap 90 prevents second seal piece 38 from separating away from shaft 30. In one non-limiting embodiment, second seal piece 38 can move radially relative to shaft 30 such that inner gap 90 fluctuates on either side of shaft 30. In such an embodiment, the size of inner gap 90 on all sides of shaft 30 maintains a small enough value to prevent problematic contaminants from passing because inner gap 90 is maintained at a value less than a size of contaminants which are problematic for first bearing assembly 24A.

If second seal piece 38 is displaced radially relative to shaft 30, inner gap 90 is maintained at a distance circumferentially around shaft 30 to prevent passage of contaminants through inner gap 90. First seal assembly 26A with high temperature resistant materials allows for first seal assembly 26A to withstand a high temperature environment within first bearing compartment 22A while also providing a high degree of sealing resiliency between shaft 30 and valve housing 12. Outer gap 92 allows for shaft 30 to move along the radial direction (e.g., upon flexion of shaft 30 during a high pressure event of flow F) and prevent second seal piece 38 from coming into contact with first spacer 42 which could cause second seal piece 38 to bend, buckle, or fail.

Figure 4:
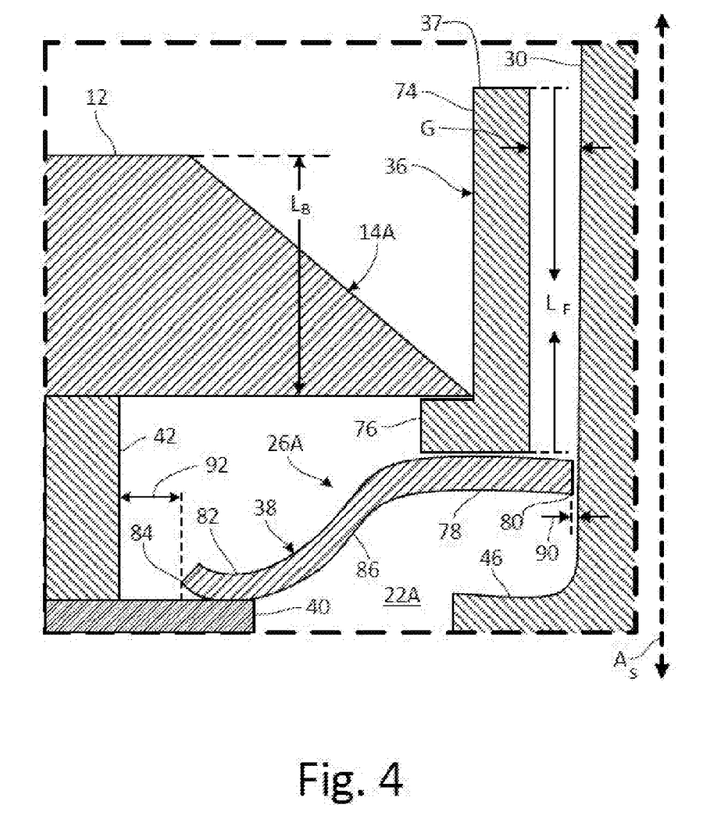
FIG. 4 is an enlarged cross-section view of a second portion of the bearing compartment of the bleed valve within detail of 4-4 in FIG. 2.

FIG. 4 is a cross-section view of first bearing housing 20A and first bearing compartment 22A of bleed valve 10 taken along 4-4 in FIG. 2. In addition to the elements discussed in relation to FIGS. 2 and 3, FIG. 4 shows axial length $L_F$ of first seal piece 36 and axial length $L_B$ of first bore 14A.

Axial length $L_F$ is a length of first seal piece 36 along the axial direction relative to shaft 30. Axial length $L_B$ is a length of first bore 14A along the axial direction relative to shaft 30. In one non-limiting embodiment, axial length $L_F$ of first seal piece 36 is greater than axial length $L_B$ of first bore 14A of valve housing 12. In another non-limiting embodiment, an axial length of cylindrical portion 74 relative to shaft 30 can be greater than axial length $L_B$ of first bore 14A.

As discussed with respect to FIG. 2, first seal piece 36 forms a seal between shaft 30 and valve housing 12 so as to prevent contaminant from falling past first seal piece 36. Because axial length $L_F$ of first seal piece 36 is greater than axial length $L_B$ of first bore 14A, cylindrical portion 74 extends higher than valve housing 12. Before the contaminant is able to pass through a gap between first seal piece 36 and shaft 30, the contaminant is forced to accumulate above a level higher than top edge 37 of first seal piece 36 (an upper edge as shown relative to orientation in FIG. 2).

This additional barrier provided by first seal piece 36 allows for short term accumulation of the contaminant in main flow passage 16 until flow control member 34 is brought into an open state and flow F of fluid can flush the contaminant from main flow passage 16.

Discussion of Possible Embodiments

The following are non-exclusive descriptions of possible embodiments of the present invention.

A seal assembly for a creating a seal between a shaft and a valve housing of a bleed valve that impedes contaminants from reaching bearings includes first and second seal pieces. The first seal piece circumferentially surrounds the shaft and is disposed between the shaft and the valve housing. The second seal piece is in contact with and is disposed axially adjacent to the first seal piece relative to the shaft. The second seal piece is biased against the first seal piece.

The seal assembly of the preceding paragraph can optionally include, additionally and/or alternatively, any one or more of the following features, configurations and/or additional components.

The first seal piece can comprise a collar with a cylindrical portion extending axially and/or a flange extending radially relative to the shaft, wherein the cylindrical portion can be shrink fit into a bore of the valve housing.

An axial length of the first seal piece relative to the shaft can be greater than an axial length of the bore of the valve housing along the axial direction relative to the shaft.

The second seal piece can include a radially inward portion with an inner edge, a radially outward portion with an outer edge, and/or a radially intermediate portion, wherein the radially inward portion can be axially biased against the flange of the first seal piece relative to the shaft.

A shim can be in contact with and can be disposed axially adjacent to the second seal piece, wherein a shape of the shim can comprise a ring, and further wherein the second seal piece can be axially biased against the shim and/or the first seal piece relative to the shaft.

The second seal piece can maintain contact with the shim and/or the first seal piece during operation of the bleed valve.

The second seal piece can be configured to axially deflect to account for a tolerance stack-up of the seal assembly.

A spacer can be disposed between the shim and the valve housing and an outer gap along a radial direction relative to the shaft between the outer edge of the second seal piece and a radially inward surface of the spacer can comprise 0.015 to 0.050 inches (0.381 to 1.270 millimeters).

An inner gap along a radial direction relative to the shaft between the shaft and the inner edge of the second seal piece can comprise 0.0005 to 0.0015 inches (0.0127 to 0.0381 millimeters).

The second seal piece can be configured to maintain the inner gap of 0.0005 to 0.0015 inches (0.0127 to 0.0381 millimeters) upon flexion, deflection, or radial displacement of the shaft.

A bleed valve includes a valve housing with a main flow passage and a bore, a shaft, a flow control member, a bearing housing with a bearing compartment, a bearing assembly, and a seal assembly. The shaft includes first and second ends, extends across the main flow passage, and is rotatable about an axis. The flow control member is mounted to the shaft and is configured to regulate a flow of a fluid through the main flow passage. The bearing housing is connected to the valve housing. The first end of the shaft extends through the bore of the valve housing into the bearing compartment. The bearing assembly is disposed in the bearing compartment. The seal assembly is disposed between the valve housing and the shaft and includes first and second seal pieces. The first seal piece circumferentially surrounds the shaft and is disposed between the shaft and the valve housing such that an axial length of the first seal piece relative to the shaft is greater than an axial length of the bore of the valve housing relative to the shaft. The second seal piece is in contact with and is disposed axially adjacent to the first seal piece relative to the shaft such that the second seal piece is axially biased against the first seal piece relative to the shaft.

The bleed valve of the preceding paragraph can optionally include, additionally and/or alternatively, any one or more of the following features, configurations and/or additional components.

The first seal piece can comprise a collar with a cylindrical portion extending axially and a flange extending radially relative to the shaft, wherein the cylindrical portion can be shrink fit into a bore of the valve housing.

The second seal piece can include a radially inward portion with an inner edge, a radially outward portion with an outer edge, and/or a radially intermediate portion, wherein the radially inward portion can be axially biased against the flange of the first seal piece relative to the shaft.

A shim can be in contact with and can be disposed axially adjacent to the second seal piece, wherein a shape of the shim can comprise a ring, and further wherein the second seal piece can be axially biased against the shim and the first seal piece relative to the shaft.

The second seal piece can maintain contact with the shim and/or the first seal piece during operation of the bleed valve.

The second seal piece can be configured to axially deflect to account for a tolerance stack-up of the seal assembly.

A spacer disposed between the shim and the valve housing and an outer gap along a radial direction relative to the shaft between the outer edge of the second seal piece and a radially inward surface of the spacer can comprise 0.015 to 0.050 inches (0.381 to 1.270 millimeters).

An inner gap along a radial direction relative to the shaft between the shaft and the inner edge of the second seal piece can comprise 0.0005 to 0.0015 inches (0.0127 to 0.0381 millimeters).

The second seal piece can be configured to maintain a radial clearance with the shaft between 0.0005 to 0.0015 inches (0.0127 to 0.0381 millimeters) upon flexion, deflection, or radial displacement of the shaft.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A bleed valve comprising:
    a valve housing with a main flow passage and a bore;
    a shaft with a first end and a second end, wherein the shaft extends across the main flow passage and is rotatable about an axis;
    a flow control member mounted to the shaft, wherein the flow control member is configured to regulate a flow of a fluid through the main flow passage;
    a bearing housing with a bearing compartment, the bearing housing connected to the valve housing, wherein the first end of the shaft extends through the bore of the valve housing into the bearing compartment;
    a bearing assembly disposed in the bearing compartment; and
    a seal assembly disposed between the valve housing and the shaft, the seal assembly comprising:
        a first seal piece circumferentially surrounding the shaft and disposed between the shaft and the valve housing, wherein an axial length of the first seal piece relative to the shaft is greater than an axial length of the bore of the valve housing closest to the shaft; and a second seal piece in contact with and disposed axially adjacent to the first seal piece relative to the shaft, wherein the second seal piece axially biases the first seal piece relative to the shaft against the valve housing.

2. The bleed valve of claim 1, wherein the first seal piece comprises a collar with a cylindrical portion extending axially and a flange extending radially relative to the shaft, wherein the cylindrical portion is shrink fit into a bore of the valve housing.

3. The bleed valve of claim 1, wherein the second seal piece includes a radially inward portion with an inner edge, a radially outward portion with an outer edge, and a radially intermediate portion, wherein the radially inward portion is axially biased against the flange of the first seal piece relative to the shaft.

4. The bleed valve of claim 3 further comprising a shim in contact with and disposed axially adjacent to the second seal piece, wherein a shape of the shim comprises a ring, and further wherein the second seal piece is axially biased against the shim and the first seal piece relative to the shaft.

5. The bleed valve of claim 4, wherein the second seal piece maintains contact with the shim and the first seal piece during operation of the bleed valve.

6. The bleed valve of claim 4, wherein the second seal piece is configured to axially deflect to account for a tolerance stack-up of the seal assembly.

7. The bleed valve of claim 6 further comprising:
a spacer disposed between the shim and the valve housing; and
an outer gap along a radial direction relative to the shaft between the outer edge of the second seal piece and a radially inward surface of the spacer comprises 0.015 to 0.050 inches (0.381 to 1.270 millimeters).

8. The bleed valve of claim 5 further comprising an inner gap along a radial direction relative to the shaft between the shaft and the inner edge of the second seal piece comprises 0.0005 to 0.0015 inches (0.0127 to 0.0381 millimeters).

9. The bleed valve of claim 8, wherein the second seal piece is configured to maintain a radial clearance with the shaft between 0.0005 to 0.0015 inches (0.0127 to 0.0381 millimeters) upon flexion, deflection, or radial displacement of the shaft.

\* \* \* \* \*